United States Patent
Ji (10) Patent No.: US 9,584,190 B2
(45) Date of Patent: Feb. 28, 2017

(54) VEHICLE DRIVING SYSTEM HAVING WIRELESS POWER TRANSMISSION FUNCTION AND METHOD THEREOF

(71) Applicant: Hyundai Motor Company, Seoul (KR)

(72) Inventor: Sang Woo Ji, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 561 days.

(21) Appl. No.: 14/139,645

(22) Filed: Dec. 23, 2013

(65) Prior Publication Data

US 2015/0003569 A1    Jan. 1, 2015

(30) Foreign Application Priority Data

Jun. 26, 2013 (KR) .......... 10-2013-0073763

(51) Int. Cl.
*H04B 1/16* (2006.01)
*H04B 5/00* (2006.01)
*B60W 10/04* (2006.01)

(52) U.S. Cl.
CPC ............ *H04B 5/0037* (2013.01); *B60W 10/04* (2013.01); *H04B 1/16* (2013.01); *H04B 5/0075* (2013.01)

(58) Field of Classification Search
CPC ....... H04B 5/0037; H04B 5/0075; H04B 1/16; B60W 10/04
USPC .......................................................... 307/9.1
See application file for complete search history.

(56) References Cited

U.S. PATENT DOCUMENTS

| 2007/0222570 | A1 | 9/2007 | Ou et al. | |
| 2009/0151441 | A1 | 6/2009 | Yim et al. | |
| 2014/0184067 | A1* | 7/2014 | Frankovich | B62J 6/00 315/77 |
| 2014/0252813 | A1* | 9/2014 | Lee | H02J 17/00 297/180.12 |
| 2015/0162785 | A1* | 6/2015 | Lee | H02J 17/00 307/104 |

FOREIGN PATENT DOCUMENTS

| JP | 2006-117144 A | 5/2006 |
| JP | 2007230355 A | 9/2007 |
| JP | 2009-120019 A | 6/2009 |
| JP | 5102596 B2 | 12/2012 |
| KR | 2001-0104858 A | 11/2001 |
| KR | 10-0951988 B1 | 4/2010 |
| KR | 10-2011-0039602 A | 4/2011 |
| KR | 10-2012-0048306 A | 5/2012 |

\* cited by examiner

*Primary Examiner* — Jared Fureman
*Assistant Examiner* — Duc M Pham
(74) *Attorney, Agent, or Firm* — McDermott Will & Emery LLP (57) ABSTRACT

A vehicle driving system having a wireless power transmission function includes a driving controller configured to generate a high frequency AC voltage corresponding to a device by using a DC voltage applied from a battery within a vehicle and generate a magnetic field by applying the generated high frequency AC voltage to a primary coil. A smoother is configured to smooth an AC voltage induced by a secondary coil into a predetermined level of DC voltage and supply a constant voltage to the device, wherein the device is operated based on the constant voltage supplied from the smoother.

12 Claims, 6 Drawing Sheets

Fig.5

VEHICLE DRIVING SYSTEM HAVING WIRELESS POWER TRANSMISSION FUNCTION AND METHOD THEREOF

CROSS-REFERENCE TO RELATED APPLICATION

This application is based on and claims the benefit of priority to Korean Patent Application No. 10-2013-0073763, filed on Jun. 26, 2013 in the Korean Intellectual Property Office, the disclosure of which is incorporated herein in its entirety by reference.

TECHNICAL FIELD

The present disclosure relates to a vehicle driving system having a wireless power transmission function and a method thereof, and more particularly, to a technology of wirelessly supplying power to various devices mounted in a hub bearing, a wheel, or the like, of a vehicle to drive the devices.

BACKGROUND

A vehicle is an apparatus which moves from one place to another place by allowing engine power to drive its own front wheels and rear wheels and includes various devices to secure the safety of passengers within a vehicle.

The device includes a tire pressure monitoring system (TPMS) sensor which senses a tire pressure to optimally maintain an air pressure of a tire and provides the sensed tire pressure to a driver, and a hot wire tire which prevents a tire from sliding on a snowy road or an icy road. A wheel lighting system (LED) provides a getting on/off safety of passengers of a vehicle, and a variable wheel increases a driving performance of the vehicle.

The above-mentioned devices consume battery power of the vehicle and do not operate without power.

Therefore, the devices are necessarily supplied with power. However, since all of the TPMS sensor, the hot wire tire, the wheel lighting system, and the variable wheel are mounted in rotating bodies (hub bearing, wheel, and the like) of the vehicle, the devices are not easily supplied with power.

SUMMARY

The present disclosure has been made to solve the above-mentioned problems occurring in the prior art while advantages achieved by the prior art are maintained intact.

An aspect of the present disclosure provides a vehicle driving system having a wireless power transmission function capable of more efficiently driving various devices without each device including batteries, by wirelessly supplying power to various devices mounted in a hub bearing, a wheel, or the like, of a vehicle so as to drive the devices, and a method thereof.

According to an exemplary embodiment of the present disclosure, a vehicle driving system having a wireless power transmission function includes a driving controller configured to generate a high frequency AC voltage corresponding to a device by using a DC voltage applied from a battery within a vehicle and generate a magnetic field by applying the generated high frequency AC voltage to a primary coil. A smoother is configured to smooth an AC voltage induced by a secondary coil into a predetermined level of DC voltage and supply a constant voltage to the device, wherein the device is operated based on the constant voltage supplied from the smoother.

According to another exemplary embodiment of the present disclosure, a vehicle driving system having a wireless power transmission function includes a driving controller configured to generate a high frequency AC voltage corresponding to a wheel lighting system by using a DC voltage applied from a battery within a vehicle and generate a magnetic field by applying the generated high frequency AC voltage to a primary coil. A smoother is configured to smooth an AC voltage induced by a secondary coil into a predetermined level of DC voltage and supply a constant voltage to the wheel lighting system. Wherein at least one wheel lighting system is mounted at one side and the other side of a wheel and operates based on the constant voltage supplied from the smoother.

According to another exemplary embodiment of the present disclosure, a vehicle driving system having a wireless power transmission function includes a driving controller configured to generate a high frequency AC voltage corresponding to a variable wheel by using a DC voltage applied from a battery within a vehicle and generate a magnetic field by applying the generated high frequency AC voltage to a primary coil. A smoother is configured to smooth an AC voltage induced by a secondary coil into a predetermined level of DC voltage and generate a constant voltage to the variable wheel. Wherein the variable wheel is operated based on the constant voltage supplied from the driving unit and stops a groove on a surface of the wheel during the driving of the vehicle to prevent fuel efficiency from reducing due to an aerodynamic force.

According to another exemplary embodiment of the present disclosure, a method of driving a device of a vehicle includes a driving controller mounted at a knuckle of the vehicle and a smoother mounted at a hub bearing of the vehicle. The driving controller generates a high frequency AC voltage corresponding to the device by using a DC voltage applied from a battery, and a magnetic field by applying the generated high frequency AC voltage to a primary coil. The AC voltage induced by the secondary coil into the predetermined level of DC voltage is smoothened. The smoother generates a constant voltage to supply to the device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
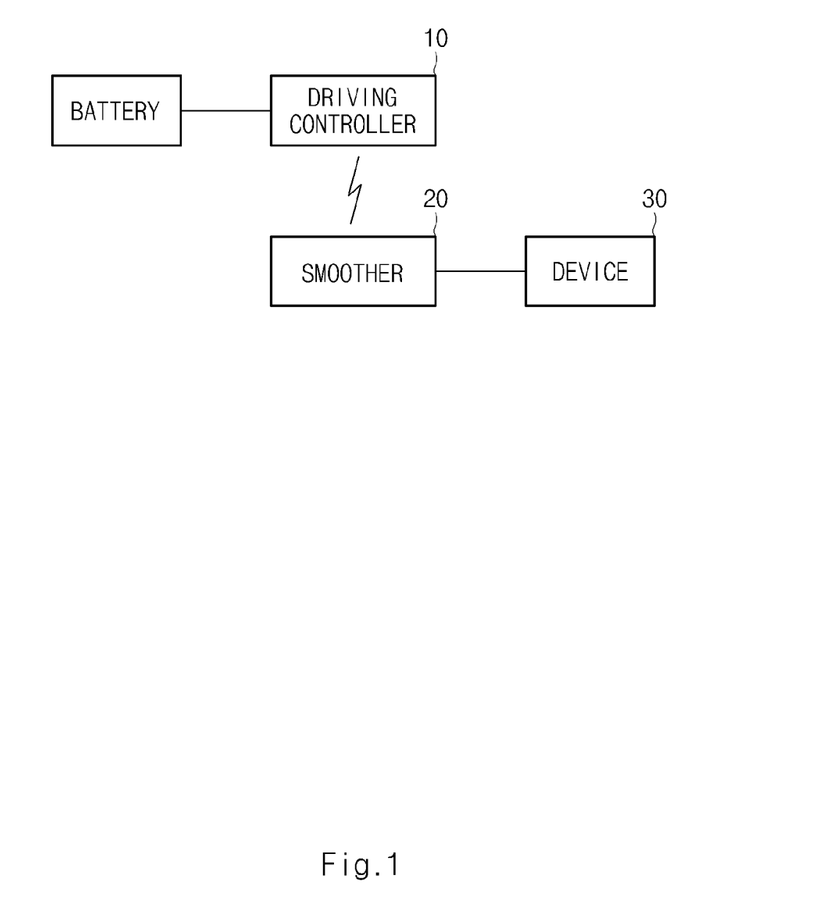
FIG. 1 is a configuration diagram of a vehicle driving system having a wireless power transmission function according to an exemplary embodiment of the present disclosure.

FIG. 1 is a configuration diagram of a vehicle driving system having a wireless power transmission function according to an exemplary embodiment of the present disclosure.

As illustrated in FIG. 1, a vehicle driving system having a wireless power transmission function according to an exemplary embodiment of the present disclosure includes a driving controller 10, a smoother 20, and a device 30.

The driving controller 10 uses a DC voltage from a battery in a vehicle to generate a high frequency AC voltage pulse (high frequency AC voltage) corresponding to the device 30 and applies the high frequency AC voltage pulse to a primary coil 12 to generate a magnetic field.

The smoother 20 smoothes the AC voltage pulse induced by a secondary coil 21 into a predetermined level of DC voltage and supplies a constant voltage to the device 30.

The device 30 is operated based on the constant voltage supplied from the smoother 20. Here, the device 30 includes a tire pressure monitoring system (TPMS) sensor, a wheel lighting system, a hot wire tire, a variable wheel, and the like.

Hereinafter, the driving controller 10 and the smoother 20 will be described in detail with reference to FIG. 2.

Figure 2:
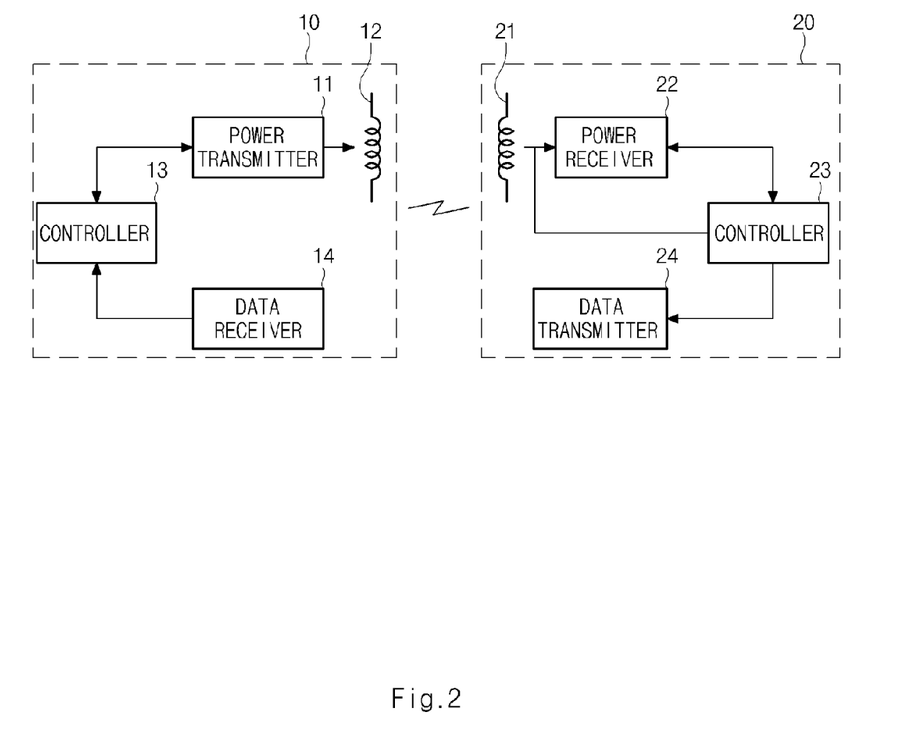
FIG. 2 is a detailed configuration diagram of a driving controller and a smoother of a vehicle driving system according to an embodiment of the present disclosure.

FIG. 2 is a detailed configuration diagram of a driving controller and a smoother of a vehicle driving system according to an exemplary embodiment of the present disclosure.

As illustrated in FIG. 2, the driving controller 10 according to an exemplary embodiment of the present disclosure includes a power transmitter 11, a primary coil 12, a second controller 13, and a data receiver 14.

First, the power transmitter 11 generates a high frequency AC voltage pulse which is equal to or more than a commercial frequency (for example, 60 Hz) by using an AC voltage applied from a battery. That is, the power transmitter 11 generates the high frequency AC voltage pulse which corresponds to the constant voltage and the constant current required in a device 30.

The power transmitter 11 may include a power driver (not illustrated), a pulse width modulation (PWM) signal generator (not illustrated), and the like.

The power driver may include a high frequency oscillation circuit which generates the high frequency AC voltage equal to or more than the commercial frequency by converting the DC voltage from the battery. A drive circuit drives the primary coil 12 by applying a pulse width modulated high frequency AC voltage pulse to the primary coil 12.

The PWM signal generator pulse-width-modulates the high frequency AC voltage which is generated by the high frequency oscillation circuit. By doing so, an output signal of the power transmitter 11 becomes the high frequency AC voltage pulse. The high frequency AC voltage pulse becomes a pulse train, and the pulse width of the pulse train may be controlled by the second controller 13. That is, the second controller 13 controls the PWM signal generator so as to generate the high frequency AC voltage pulse corresponding to the constant voltage and the constant current required by the device 30.

The primary coil 12 generates a magnetic field based on the high frequency AC voltage pulse which is generated by the power transmitter 11.

The second controller 13 then controls the power transmitter 11 so as to generate the high frequency AC voltage pulse corresponding to the constant voltage and the constant current of the device 30. That is, the second controller 13 controls the pulse width of the high frequency AC voltage pulse based on the constant voltage and the constant current of the device 30.

The data receiver 14 is an additional component and is required in the case in which the device 30 is the TPMS sensor. The TPMS sensor measures air pressure of a tire to be transmitted to the TPMS, and the data receiver 14 receives the air pressure information from the smoother 20 through the primary coil 12. In this case, the data receiver 14 may also include a demodulator which recovers the air pressure information.

As illustrated in FIG. 2, the smoother 20 according to an exemplary embodiment of the present disclosure includes a secondary coil 21, a power receiver 22, a third controller 23, and a data transmitter 24.

The secondary coil 21 is magnetically coupled with the primary coil 12 to generate induced electromotive force. In this case, since a power signal applied to the primary coil 12 is the pulse width modulation signal, the induced electromotive force induced in the secondary coil 21 also becomes the AC voltage pulse train.

Next, the power receiver 22 smoothes the AC voltage pulse induced by the secondary coil 21 into a predetermined level of DC voltage and supplies the constant voltage to the device 30.

The power receiver 22 may include a rectifier (not illustrated) and a constant voltage and constant current circuit (not illustrated). In this case, the rectifier is connected to an output terminal of the secondary coil 21 and smoothes the AC voltage pulse induced by the secondary coil 21 into a predetermined level of DC voltage. Further, the constant voltage and constant current circuit uses the predetermined level of DC voltage to generate the constant voltage and constant current to be supplied to the device 30.

The third controller 23 then controls the power receiver 22 to smooth the AC voltage pulse induced by the secondary coil 21 into the predetermined level of DC voltage and supply the constant voltage and constant current to the device 30.

Further, the controller 23 synchronizes the data transmitter 24 and transmits the data at a falling time of the AC voltage pulse induced by the secondary coil 21 at the time of receiving the data (for example, the sensing signal of the TPMS sensor) from the device 30. Then, the data transmitter 24 transmits the data to the driving controller 10 under the control of the third controller 23.

Figure 3:
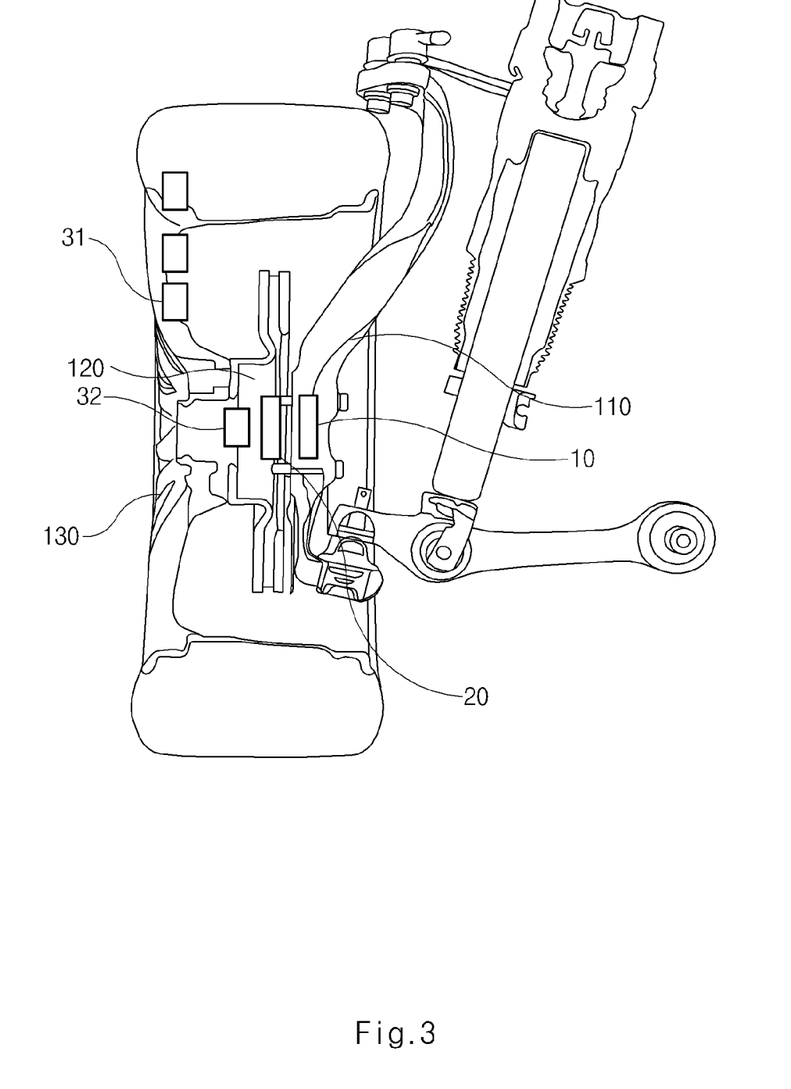
FIG. 3 is a structure view of a vehicle driving system having a wireless power transmission function according to an exemplary embodiment of the present disclosure.

FIG. 3 is a structure view of a vehicle driving system having a wireless power transmission function according to an exemplary embodiment of the present disclosure and illustrates the case in which the driven device 30 is a wheel lighting system (LED).

FIG. 3 shows a knuckle 110 which is a non-rotating body fixed without rotating, a hub bearing 120 which is a rotating body, and a wheel 130.

As illustrated in FIG. 3, the driving controller 10 is disposed at the knuckle 110 and the smoother 20 is disposed at the hub bearing. As described above, the driving controller 10 and the smoother 20 do not contact each other to wirelessly supply power. In this case, the driving controller 10 may supply power to the smoother 20 independent of whether the hub bearing rotates.

In addition, at least one wheel lighting system 31 which is an example of the device 30 is mounted at one side and the other side of the wheel 130 and is operated based on the constant voltage supplied from the smoother 20 under a control of a lighting controller 32.

The hot wire tire and the TPMS sensor which are another example of the device 30 are operated by the same manner. In this case, a hot wire tire controller (not illustrated) or a TPMS sensor controller (not illustrated) is provided, instead of the lighting controller 32.

According to an exemplary embodiment of the present disclosure, the lighting controller 32 and the smoother 20 each are separately implemented, but the lighting controller 32 may also be mounted in the smoother 20. Further, the position of the wheel lighting 31 may be mounted at various positions of the wheel 130 depending on the designer's intention.

Figure 4A:
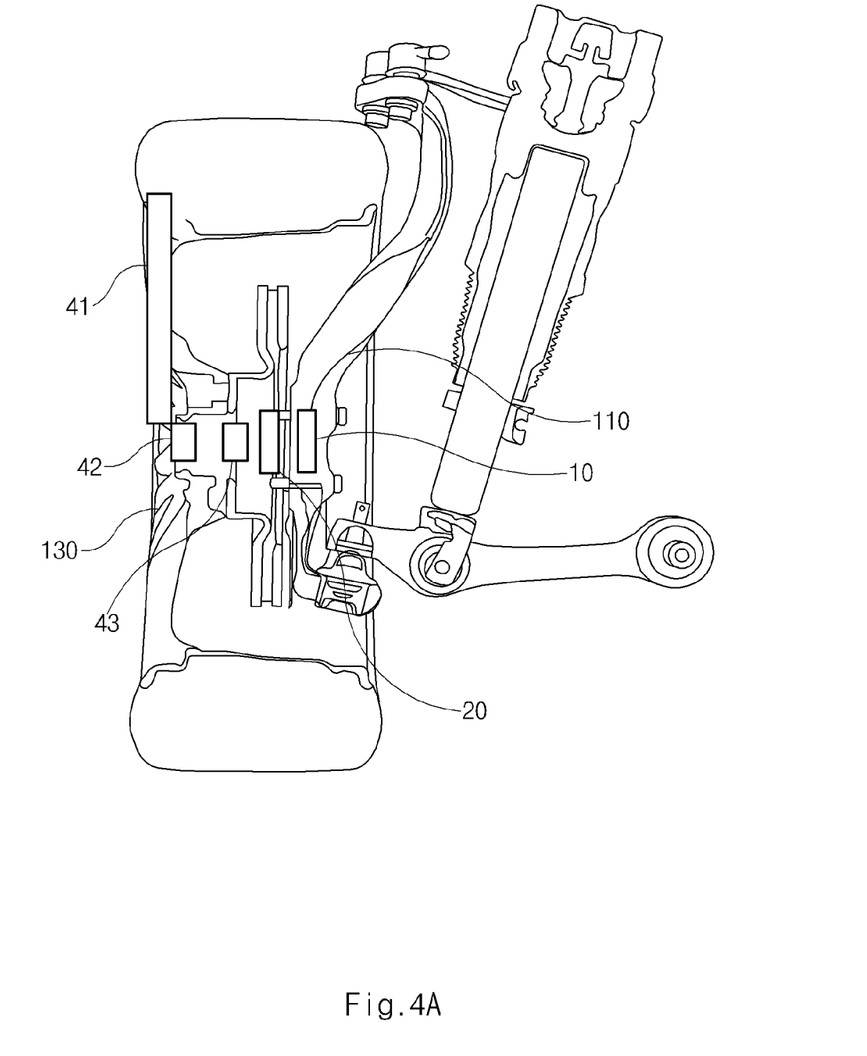
FIG. 4A is a structure view of a vehicle driving system having a wireless power transmission function according to another exemplary embodiment of the present disclosure.

FIG. 4A is a structure view of a vehicle driving system having a wireless power transmission function according to another exemplary embodiment of the present disclosure and illustrates the case in which the device 30 to be driven is a variable wheel.

As illustrated in FIG. 4A, the variable wheel is a wheel which may cover a groove on a surface of the wheel during driving to improve aerodynamic performance. The variable wheel includes a cover 41 which covers the groove on the surface of the wheel, a motor 42 which reciprocally rotates the cover, and a motor controller 43 which controls the motor 42.

Figure 4B:
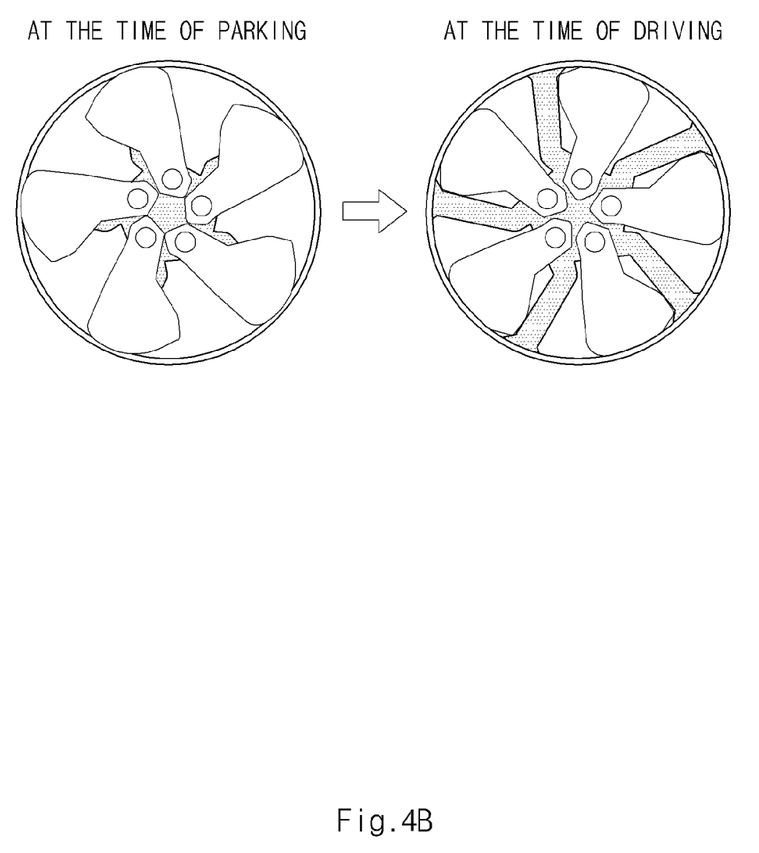
FIG. 4B is an exemplified diagram illustrating a state in which a variable wheel is driven by a vehicle driving system according to an exemplary embodiment of the present disclosure.

Generally, the surface of the wheel to which the tire is attached has at least one groove through which air passes. The air introduced through the groove generates an aerodynamic force to reduce fuel efficiency. As illustrated in FIG. 4B, the variable wheel covers the groove on the surface of the wheel during the driving of the vehicle to prevent reduced fuel efficiency from because of the aerodynamic force.

An exemplary embodiment of the present disclosure describes an example in which the driving controller 10 and the smoother 20 are vertically disposed to the driving shaft on the driving shaft of the wheel, but is not limited thereto.

Figure 5:
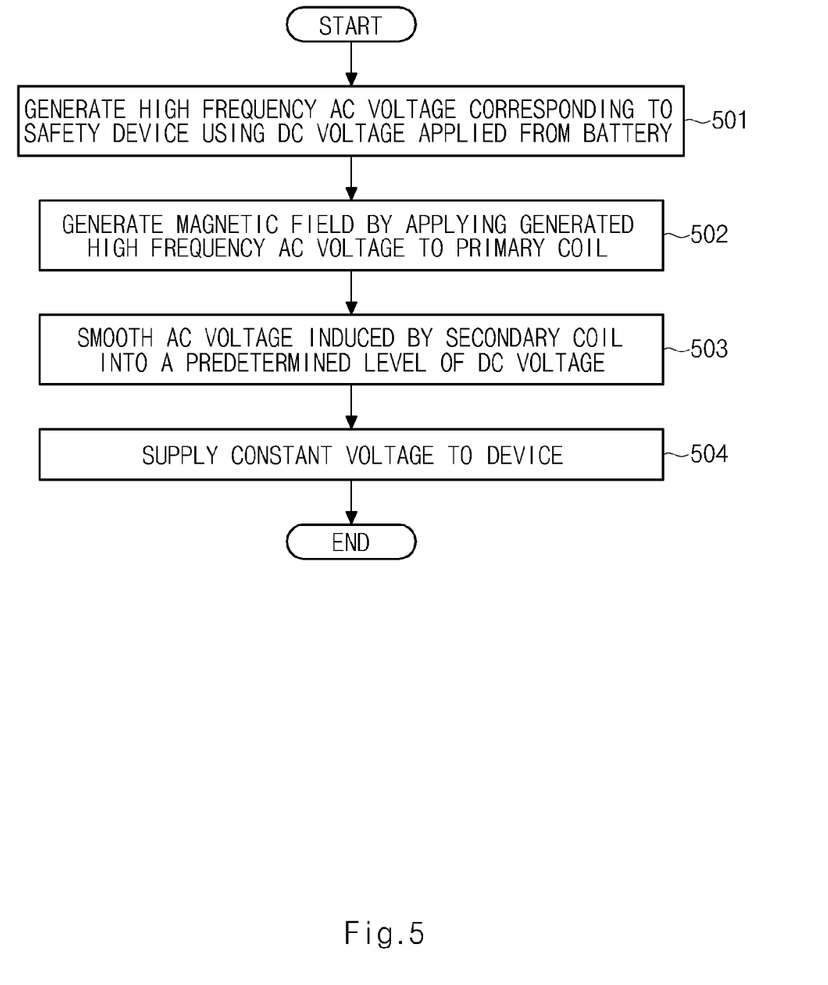
FIG. 5 is a flow chart of a method of driving a device in a vehicle using a wireless power transmission function according to an exemplary embodiment of the present disclosure.

FIG. 5 is a flow chart of a method of driving a device of a vehicle using a wireless power transmission function according to an exemplary embodiment of the present disclosure. The driving controller is mounted at the knuckle of the vehicle, and the smoother is mounted at the hub bearing of the vehicle to drive the device of the vehicle.

First, the driving controller 10 uses the DC voltage applied from the battery to generate the high frequency AC voltage corresponding to the device (501). The driving controller 10 then applies the generated high frequency AC voltage to the primary coil to generate the magnetic field (502). The smoother smoothes the AC voltage induced by the secondary coil into the predetermined level of DC voltage (503). Then, the smoother supplies the constant voltage to the device (504).

Due to the process, the battery is not necessary in each device, and various devices may be more efficiently driven.

As set forth above, according to the exemplary embodiments of the present disclosure, it is possible to more efficiently drive various devices without each device including the batteries, by wirelessly supplying power to the devices mounted in the hub bearing, the wheel, or the like, of the vehicle to drive the devices.

The present disclosure described above may be variously substituted, altered, and modified by those skilled in the art to which the present disclosure pertains without departing from the scope and spirit of the present disclosure. Therefore, the present disclosure is not limited to the above-mentioned exemplary embodiments and the accompanying drawings.

What is claimed is:

1. A vehicle driving system having a wireless power transmission function, comprising:
   a driving controller configured to generate a high frequency AC voltage corresponding to a device by using a DC voltage applied from a battery within a vehicle and generate a magnetic field by applying the generated high frequency AC voltage to a primary coil; and
   a smoother configured to smooth an AC voltage induced by a secondary coil into a predetermined level of DC voltage and supply a constant voltage to the device,
   wherein the device is operated based on the constant voltage supplied from the smoother, and
   wherein the driving controller is mounted at a knuckle or a hub bearing of the vehicle, and the smoother is mounted at a hub bearing of the vehicle.

2. The vehicle driving system according to claim 1, wherein the driving controller includes:
   a power transmitter which uses the DC voltage applied from the battery to generate a high frequency DC voltage corresponding to a constant voltage and a constant current required for the device;
   the primary coil, which generates a magnetic field based on the high frequency AC voltage generated by the power transmitter; and
   a second controller, which controls the power transmitter to generate the high frequency AC voltage corresponding to the constant voltage and the constant current of the device.

3. The vehicle driving system according to claim 2, further comprising:
   a data receiver configured to receive data from the smoother through the primary coil.

4. The vehicle driving system according to claim 1, wherein the smoother includes:
   the secondary coil which is magnetically coupled with the primary coil to generate an induced electromotive force;
   a power receiver which smoothes the AC voltage induced by the secondary coil into the predetermined level of DC voltage and supplies the constant voltage to the device; and
   a third controller which controls the power receiver to smooth the AC voltage induced by the secondary coil into the predetermined level of DC voltage and supply the constant voltage to the device.

5. The vehicle driving system according to claim 4, further comprising:
   a data transmitter configured to transmit data to the driving controller,
   wherein the driving controller controls the data transmitter to synchronize and transmit the data at a falling time of the AC voltage induced by the secondary coil at the time of receiving the data from the device.

6. The vehicle driving system according to claim 1, wherein the device is any one of a tire pressure monitoring system (TPMS) sensor, a wheel lighting system, a hot wire tire, and a variable wheel.

7. A vehicle driving system having a wireless power transmission function, comprising:
- a driving controller configured to generate a high frequency AC voltage corresponding to a wheel lighting system by using a DC voltage applied from a battery within a vehicle and generate a magnetic field by applying the generated high frequency AC voltage to a primary coil; and
- a smoother configured to smooth an AC voltage induced by a secondary coil into a predetermined level of DC voltage and supply a constant voltage to the wheel lighting system,
- wherein at least one wheel lighting system is mounted at one side and another side of a wheel and is operated based on the constant voltage supplied from the smoother, and
- wherein the driving controller is mounted at a knuckle or a hub bearing of the vehicle, and the smoother is mounted at a hub bearing of the vehicle.

8. A vehicle driving system having a wireless power transmission function, comprising:
- a driving controller configured to generate a high frequency AC voltage corresponding to a variable wheel by using a DC voltage applied from a battery within a vehicle and generate a magnetic field by applying the generated high frequency AC voltage to a primary coil; and
- a smoother configured to smooth an AC voltage induced by a secondary coil into a predetermined level of DC voltage and supply a constant voltage to the variable wheel,
- wherein the variable wheel is operated based on the constant voltage supplied from the driving unit and stops a groove on a surface of the wheel during the driving of the vehicle to prevent fuel efficiency from reducing due to an aerodynamic force.

9. The vehicle driving system according to claim 8, wherein the variable wheel includes:
- a cover which covers the groove on the surface of the wheel;
- a motor which reciprocally rotates the cover; and
- a motor controller which controls the motor.

10. A method of driving a device of a vehicle including a driving controller mounted at a knuckle of the vehicle and a smoother mounted at a hub bearing of the vehicle, the method comprising:
- generating, by the driving controller, a high frequency AC voltage corresponding to the device by using a DC voltage applied from a battery;
- generating, by the driving controller, a magnetic field by applying the generated high frequency AC voltage to a primary coil;
- smoothing, by the smoother, the AC voltage induced by a secondary coil into a predetermined level of DC voltage; and
- supplying, by the smoother, a constant voltage to the device.

11. The method according to claim 10, further comprising:
- synchronizing and transmitting, by the smoother, received data at a falling time of the AC voltage induced by the secondary coil at the time of receiving the data from the device.

12. The method according to claim 11, further comprising:
- receiving, by the driving controller, the data from the smoother through the primary coil.

* * * * *